United States Patent [19]

Felske et al.

[11] Patent Number: 4,743,452
[45] Date of Patent: * May 10, 1988

[54] METHOD FOR PRODUCING FROZEN YEAST-LEAVENED DOUGH

[75] Inventors: Lisa V. Felske, Eastchester, N.Y.; Roy F. Silva, Norwalk, Conn.

[73] Assignee: Stauffer Chemical Company, Westport, Conn.

[*] Notice: The portion of the term of this patent subsequent to Feb. 19, 2002 has been disclaimed.

[21] Appl. No.: 869,478

[22] Filed: Jun. 2, 1986

Related U.S. Application Data

[63] Continuation-in-part of Ser. No. 869,477, Jun. 2, 1986, which is a continuation-in-part of Ser. No. 755,871, Jul. 17, 1985, abandoned.

[51] Int. Cl.$^4$ ............................................... A21D 8/00
[52] U.S. Cl. ........................................ 426/19; 426/62; 426/25; 426/26
[58] Field of Search ......................... 426/19, 25, 26, 62

[56] References Cited

U.S. PATENT DOCUMENTS

| | | | |
|---|---|---|---|
| 3,560,219 | 2/1971 | Attebery . | |
| 3,894,155 | 7/1975 | Ono et al. | 426/25 |
| 4,036,999 | 7/1977 | Grindstaff | 426/41 |
| 4,198,438 | 4/1980 | Singer et al. | 426/549 |
| 4,395,426 | 7/1983 | Fan | 426/62 |
| 4,399,160 | 8/1983 | Schwartz et al. | 426/41 |
| 4,405,648 | 9/1983 | Atsumi | 426/19 |
| 4,406,911 | 9/1983 | Larson et al. | 426/19 |
| 4,424,237 | 1/1984 | Wittman | 426/653 |
| 4,442,128 | 4/1984 | Schwartz et al. | 426/41 |
| 4,444,792 | 4/1984 | Schwartz et al. | 426/41 |
| 4,444,793 | 4/1984 | Schwartz et al. | 426/41 |
| 4,450,177 | 5/1984 | Larson et al. | 426/19 |
| 4,481,222 | 11/1984 | Fan | 426/62 |
| 4,500,548 | 2/1985 | Silva | 426/19 |

FOREIGN PATENT DOCUMENTS

| | | |
|---|---|---|
| 1109726 | 9/1981 | Canada . |
| 1142387 | 3/1983 | Canada . |
| 5509703 | 6/1978 | Japan . |
| 53-99347 | 8/1978 | Japan . |
| 54-129151 | 10/1979 | Japan . |
| 58-09641 | 1/1983 | Japan . |
| 7906460 | 3/1981 | Netherlands . |
| 1556815 | 11/1979 | United Kingdom . |

OTHER PUBLICATIONS

Handbook of Food Additives, 2nd Ed., pp. 325–341, CRC Press, 1972.

Primary Examiner—Joseph Golian
Attorney, Agent, or Firm—Paul J. Juettner

[57] ABSTRACT

A frozen dough can be prepared by formulating the frozen dough with a hydrocolloid and a fermentation aid. The dough is prepared by conventional methods and frozen before proofing. Upon removal from the freezer the dough can be thaw-proofed in an oven and baked in a short period of time.

22 Claims, No Drawings

METHOD FOR PRODUCING FROZEN YEAST-LEAVENED DOUGH

CROSS REFERENCE TO RELATED APPLICATIONS

This application is a continuation-in-part application of application Ser. No. 869,477 filed June 2, 1986, which in turn is a continuation-in-part of Ser. No. 755,871 filed July 17, 1985 now abandoned.

The present invention relates to yeast leavened frozen dough and to a method of preparing the same.

BACKGROUND OF THE PRESENT INVENTION

The present invention relates to a method for producing frozen dough without the need for preproofing and which can be subjected to baking without the traditional thawing procedures.

Freezing of baking dough for distribution has widely come into effect in the United States. The process for preparing frozen doughs and baking the same has several drawbacks. Among them are the length of time needed for preparing the dough prior to freezing and distribution as well as the time needed in preparing the dough for baking. Further, problems have arisen in the stability of the dough after freezing and thawing.

In the past, two types of frozen dough systems have been used. The most commercially acceptable frozen dough system involves the preparation of a frozen dough by the straight dough method which comprises the steps of formulation and mixing; division rounding, and molding; and freezing and storage. The dough is not proofed prior to freezing. The dough fermentation before freezing is suppressed to preserve the yeast activity until proofing after thawing. This is accomplished by maintaining the ingredients in a cool state which is not conducive to yeast growth during mixing. The dough must undergo a thawing procedure and proofing steps which usually required two to twelve hours for thawing and one to four hours for proofing. This is inconvenient inasmuch as the bread dough should be removed from the freezer at least twelve hours ahead of time and cannot be used "instantaneously".

An alternative is the no-thaw dough system such as disclosed in U.S. Pat. Nos. 4,450,177 and 4,406,911. In these patents, a frozen dough is prepared using the straight dough method comprising the steps of formulation, mixing, fermentation in bulk, division, shaping, proofing followed by freezing and storage. Under this system, the usual bread ingredients are complimented with a combination of gums, protein film formers such as vital wheat gluten, milk proteins and the like and surface active agents. The ingredients can be mixed at ambient temperature inasmuch as yeast activity is not suppressed. Since proofing takes place before freezing, thawing and proofing are not required so that the bread can proceed from the freezer through baking within an hour.

One difficulty with this procedure is the time requirement needed to proof the dough prior to freezing. High speed processing is more desirable for a more economical product. In addition, manufacturers are hesitant about packaging proofed dough in containers such as bags because of the tendency to tear the dough and cause loss of entrapped gas. Nonproofed dough is not subject to those problems and can be handled on an automatic packaging line without cause for worry regarding damaging of the proofed bread.

While each of these techniques is effective, they both have drawbacks which in effect make each one of them unsatisfactory.

SUMMARY OF THE INVENTION

In accordance with the invention, a frozen dough can be prepared which does not require a separate thawing step prior to proofing nor preproofing in the manufacturing stage. The product of the invention is capable of sustaining long periods of freezing while producing a good quality loaf of baked bread. A fresh baked loaf of bread can be prepared within a short time of the removal of the frozen dough from the freezer.

The method of the present invention for producing the frozen bread dough comprises the steps of formulating standard bread ingredients in combination with a hydrocolloid and a fermentation time reducer (fermentation aid composition); forming and shaping the dough followed by packaging and freezing. The dough upon removal from the freezer can be thawed and proofed at the same time for short times such as in an oven or proofing device and then baked without the necessity of thawing and proofing as separate processing steps. The product of the present invention can be removed from frozen storage and utilized within a short period of time without the traditional wait for thawing and proofing which can total from four to twelve hours.

DETAILED DESCRIPTION OF THE INVENTION

As employed herein, the term "fermentation" is meant to include all changes in the dough brought about by the action of yeast which functions to aerate a dough and ripen the gluten. Total fermentation time includes the time elapsed during fermentation of the dough in bulk, resting or benching and make-up. For the sake of clarity, traditional baking terminology is defined below and employed when appropriate to identify the specific dough treatment steps during which fermentation occurs.

"Fermentation in bulk" occurs after the dough formulation is mixed and is allowed to stand before it is divided into separate portions.

"Resting" is used interchangeably with "benching" to denote periods of time allowed to give the gluten flour sufficient time to recover from any step such as dividing, molding, forming and the like wherein the dough has been stretched or worked.

"Proofing" is the final step before baking wherein time is allowed for the yeast to produce more gas to give an expanded volume and vesiculation to the molded or shaped dough portions.

As used herein all percentages are on a flour basis unless otherwise stated.

The present invention is directed to the production and use of frozen yeast leavened doughs. The doughs can be sweet doughs, bread doughs, specialty products such as pizza doughs and the like as long as they are yeast-raised. The dough can be shaped into loaves, rolls, buns, or any other form desirable. As bread is representative of the class, the present discussion will be continued in connection with bread though the discussion is equally applicable to the other forms of yeast raised doughs contemplated within the scope of the invention.

Bread dough compositions are comprised of flour, water, sugar, yeast, salt, shortening, and other ingredients such as oxidizing agents, dough conditioners and the like. The frozen dough compositions of the invention contain the usual frozen dough ingredients in proportions preferred by the baker. In addition, the dough of the invention includes a hydrocolloid or mixtures of hydrocolloids and a fermentation aid.

Hydrocolloids or gums (such as defined in the Handbook of Food Additives, pp. 295–359, 2nd Edition, CRC Press, 1972, which is incorporated herein by reference), when combined with the remaining components of the present invention, provides an acceptable loaf volume even after several weeks of freezer storage. The hydrocolloid is used in an amount sufficient to tie up excess water and preferably in amounts ranging from about 0.1 to about 1.0% on a flour basis. Hydrocolloids such as xanthan, tragacanth, guar, carrageenan, carboxymethylcellulose and others are effective. Preferably, the gum is xanthan gum for its known ability to provide freeze-thaw stability and prevent ice crystal formation in frozen foods.

Preferably, the hydrocolloid is a functionalized dairy product containing a thickening polymer prepared with a polymer producing microorganism that grows on the dairy substrate. The functionalized dairy product is characterized by a viscosity of above about 200 centipoises at a shear rate of $12$ s$^{-1}$ in a 1% weight per volume solution. The preferred microorganisms are of the genus Xanthomonas such as *Xanthomonas campestris*. Microorganisms of the species *Leuconostoc mesenteroides* can be used.

Functionalized dairy products containing a thickening polymer for use in the present invention can be prepared by fermenting a polymer-producing organism in a dairy-based substrate containing carbohydrates suitable for growing the desired microorganism. The functionalized dairy product containing a thickening polymer can be prepared by fermenting a suitable dairy-based growth substrate with an organism of the genus Xanthomonas which provides the functional polymer thickener having a viscosity of above 200 centipoise at a shear rate of $12$ s$^{-1}$ such as *Xanthomonas campestris* and/or *Leuconostoc mesenteroides* or mixtures of those products. Preferably, the microorganism is selected from the group of *X. campestris* ATCC 31922, *X. campestris* ATCC 31923 and/or *L. mesenteroides* ATCC 14935. Functionalized dairy products prepared with these microorganisms are disclosed in:

U.S. Pat. No. 4,399,160 which discloses a dry blend of functionalized whey products prepared from *X. campestris* ATCC 31923 and *L. mesenteroides* ATCC 14935;

U.S Pat. No. 4,442,128 which discloses a functionalized whey and glucose product prepared by fermenting with *X. campestris* ATCC 31922;

U.S. Pat. No. 4,444,792 which discloses whey functionalized by fermenting with *X. campestris* ATCC 31923; and U.S. Pat. No. 4,444,793 which discloses a functionalized whey and sucrose product prepared by fermenting with *L. mesenteroides* ATCC 14935.

The disclosures of U.S. Pat. Nos. 4,399,160; 4,442,128; 4,444,792 and 4,444,793 are incorporated herein by reference. The stated organisms are on deposit with the American Type Culture Collection, Rockville, MD.

The functionalized dairy-based products used in the invention can be prepared by fermenting a dairy-based carbohydrate-containing substrate adapted for growing the particular microorganism used. *X. campestris* ATCC 31923 has the ability to utilize lactose as its sole source of carbon; *X. campestris* ATCC 31922 reproduces on a substrate of glucose while *L. mesenteroides* requires a substrate of sucrose as the carbohydrate source in addition to the dairy base. The lactose for the substrate can be added as pure lactose or as part of another dairy-based product such as milk, defatted milk, milk solids, milk solids non-fat, whey, deproteinized whey such as by gel filtration or ultrafiltration, demineralized whey such as by ion exchange, chemical isolation or ultrafiltration, deproteinized demineralized whey and any other lactose-containing milk by-product obtained from the processing of milk, cheese or whey. The lactose-containing product must be in a form which can be used by and not be toxic to the microorganism. Included in deproteinized whey are the by-products from the concentration of whey protein using gel filtration (U.S. Pat. Nos. 3,560,219 and 4,036,999) and particularly the lactose-containing permeate resulting from the separation of whey protein from whey by ultrafiltration. The substrate is preferably pasteurized or sterilized to prevent growth of contaminant bacteria, such as those which might change the flavor or odor characteristics.

The substrate must contain the critical carbohydrate in an amount sufficient to allow significant microorganism growth. Where lactose is used, the term "lactose" is intended to refer to unhydrolyzed lactose. Lactose is considered a dairy product for purposes of this application. Where glucose is used, the term "glucose" can include, in addition to glucose, lactose hydrolyzed to glucose and galactose.

It is also desirable to incorporate in the substrate (or fermentation broth), a nitrogen-containing composition which acts as a stimulant for the growth of the bacteria. It has been found that polypeptide-containing nitrogen sources such as hydrolyzed protein are effective in stimulating growth. Illustrative of compositions useful in this area are yeast extract, yeast autolysate, yeast hydrolysate, solubilized yeast, yeast food, pancreas extract, amino acids, hydrolyzed plant and animal protein, hydrolzyed casein, and mixtures thereof. Any nitrogen-containing or protein-containing source which will act as a growth stimulant can be used for this function. Non-protein nitrogen sources such as mono- or diammonium phosphate also act as stimulants. It is particularly preferred to use both a non-protein nitrogen source and a hydrolyzed protein.

Yeast in the substrate can range from about 0 percent to about 6 percent based on the weight of the dry solids in the initial substrate or from about 0 percent to about 0.5 percent and preferably from about 0.01 percent to about 0.1 percent based on the weight of the broth.

Trace vitamins and minerals of less than 1 percent and preferably less than 0.5 percent by weight of the substrate can also be included for their known beneficial effects to culture systems. These include B vitamins, ferrous sulfate, magnesium sulfate, and manganese sulfate. Generally, the Fe, Mg and Mn ions are present in some of the dairy products which act as the lactose source or in hydrolyzed protein such as the yeast extract.

To ensure the ability of *X. campestris* ATCC 31923 to produce polymer solutions in a lactose medium, the strain is routinely maintained in lactose-minimal medium during storage and inocula production. Prolonged maintenance of the strain in a complex medium containing alternate carbon sources containing whey protein, glucose and similar sources results in the loss of the ability of ATCC 31923 to produce viscous broths. This indicates a reversion of the strain to preferential growth on protein.

The concentration of the carbohydrate source such as lactose in the substrate is sufficient to allow formation of a functionalized dairy product having a viscosity greater than 200 centipoises and preferably greater than 800 centipoises at a 12 s$^{-1}$ shear rate. For instance, in fermenting *X. campestris* ATCC 31923 lactose concentration generally ranges from about 0.3 percent to about 8.5 percent by weight based on the broth volume. Dried whey in an amount ranging from about 0.5 percent to about 12 percent by weight based on the volume of the broth can be used to provide the necessary lactose. Preferably the lactose content ranges from about 1 percent to about 4 percent depending on the microorganism used.

In fermenting the *L. mesenteroides* ATCC 14935, from about 5 percent to about 20 percent and preferably from about 8 percent to about 12 percent sucrose is added. In fermenting the *X. campestris* ATCC 31922, from about 0.5 percent to about 12 percent and preferably from about 1 percent to about 3 percent glucose (or hydrolyzed lactose in an amount sufficient to provide that level of glucose) can be added.

The fermentation can be carried out at a pH ranging from about 5.5 to about 8, and preferably from about 6.0 to about 7.5 depending on the microorganism used. The fermentation temperature is sufficient for bacterial growth. Temperatures within the range of from about 20° C. to about 35° C. and preferably within the range of from about 25° C. to about 30° C. can be used.

The fermentation of *X. campestris* strains ATCC 31922 and 31923 is an aerobic fermentation while the fermentation of the *L. mesenteroides* is anerobic.

The fermentation is carried out for a period of time sufficient to provide the desired viscosity (from about 30 to about 70 hours).

The functionalized dairy product can be used as is, dried or blended with other ingredients (before or after drying).

The fermentation aid as preferably used in the invention is a composition which is effective in aiding the fermentation. Preferably, the fermentation aid comprises a dried ferment residue prepared by a process comprising fermenting a mixture of flour, water, optionally sugar and a yeast such as the species *Saccharomyces cerevisiae* (baker's yeast) for a period time sufficient in the absence of other ingredients to decrease the initial pH of the mixture below a pH of about 4.75 and drying the resultant product in the conditions such that major amount of the volatile components with the exception of water remain after drying. By the use of this fermentation aid, the benefits of fermentation i.e. proofing can be obtained while allowing for a reduction in the time needed to achieve that end. A product of this nature and a method for producing same is disclosed in U.S. Pat. No. 4,500,548, the disclosure of which is hereby incorporated herein by reference.

The fermentation aid can be prepared by blending ingredients commonly used in preparing bread ferments such as flour, water and optionally sugar, yeast foods, salt and antimicrobial agents. The yeast of the species *Saccharomyces cerevisiae,* also known as baker's yeast, is preferably used as a compressed yeast though the dried form can also be used. The ratio of flour to water is variable though it preferably ranges from about 55 parts to about 250 parts by weight water per 100 parts flour.

The yeast is used in amounts sufficient to provide the necessary cell population within a reasonable period of time. The amount of yeast used (based on compressed yeast) can range from about 1.5% to about 10%) preferably from about 2% to about 6%. The cell count can range from about $30 \times 10^7$ to about $220 \times 10^7$. Salt is an optional ingredient which can be added in an amount sufficient to stabilize the fermentation rate while hindering any preferential bacterial growth.

While the flour contains sugar it does not contain enough to maintain a satisfactory rate of fermentation. Therefore, sugar in an amount ranging from 0% to about 10% and preferably from about 3% to about 8% based on the weight of the flour is used in the fermentation for a practical fermentation rate. The sugar can be any form of a mono or disaccharide which is fermentable by the yeast directly or after enzyme breakdown. The preferred sugar is sucrose.

The fermentation is conducted in accordance with good manufacturing techniques. The ingredients can be easily slurried in any order in water, the flour preferably first, in a covered vessel equipped with an agitator. The yeast can be added as a slurry as is well known. The starting pH is that conductive to good yeast growth. The starting pH which can range as high as about pH 6.0 and as low as about pH 5.0 can then be adjusted if necessary. For effective fermentation it is preferred that the starting or initial pH be within the range of from about pH 5.7 to about pH 5.1. pH adjustments can be made with food grade acids or alkalis if necessary. The fermentation can be conducted under slight agitation to keep the ingredients mixed. The fermentation time varies depending upon the quantity, aroma and taste components which it is desired to be developed in the fermentation aid. Times ranging from about 12 hours to and above 3 days have been used. Fermentation is generally conducted until the pH of the ferment drops below 4.75.

After the fermentation has been conducted to the desired end point, the product is dried under conditions such that an amount of volatile component sufficient to improve the flavor, aroma and texture of the final product remain in the dried fermentation aid. These volatile components are responsible not only for flavors and aromas but also for improved dough conditioning. Further, enzymes are inactivated by excess heating conditions and, for this reason, such conditions should be avoided. Freeze drying as well as spray drying can be used. The use of spray drying temperatures within the range of from about 55° C. to about 150° C. are preferred. By drying is meant reduction in the moisture content such that a powder dry to the touch is formed having a moisture content of from about 4.5% to about 9.0%. Drying temperatures that substantially decrease cell population are to be avoided.

Also included within the bread dough of the present invention are those ingredients normally utilized in the manufacture of frozen such as yeast foods, oxidants such as bromates, iodates or ascorbic acid, reducing agents such as sodium bisulfite, enzymes such as proteolytic and amylolytic enzymes, surfactants such as sodium or calcium stearyl 2-lactylate, flavors such as sour flavors from yogurt or cultured diary products, antimicrobial agents such as salt, acid whey, baker's vinegar, propionates and the like, color, dough conditions such as calcium peroxide and soy flour, sugar, dextrose or corn syrup, milk replacers and milk solids. These ingredients can be added separately to the dough or as part of or in combination with other dry ingredients such as the hydrocolloid or the fermentation aid.

The yeast that is used is preferably *Saccharomyces cerevisiae* (baker's yeast) though any yeast which is normally used in baking can be utilized. The yeast is preferably an instantized yeast as it has been found that the use of this type of yeast in the formulation of the present invention provides the least amount of yeast damage due to freezing. If desired, compressed yeast or other yeast can also be used but can be less effective.

The dough composition of the present invention is prepared by mixing the ingredients into a dough using the standard bread making conditions, preferably that of the straight dough method. For further protection of the yeast, the addition of the yeast is delayed as much as possible. Preferably, this can be done by adding the yeast after dough development at a point where the yeast can be sufficiently admixed into the dough. The mixing of the ingredients can be accomplished at ambient temperature or a cool temperature. It is not essential to completely suppress the fermentation activity of the yeast though conditions which may lead to extensive gas generation should be avoided. As soon as possible after the complete mixing of the dough has taken place, the dough is divided, rounded, molded and packaged. Preferably, no bench time or proofing is allowed prior to freezing. While some carbon dioxide might be formed during the forming and packaging portion of the process, this is not critical. The total time between mixing and freezing should not exceed about 10 minutes. One of ordinary skill in the art would know of the mixing times necessary to obtain dough having a proper rheological characteristics and will appreciate the different factors involved in determining that time.

The moisture content of the dough is sufficient to allow mixing and development of the dough. While prior art frozen doughs have normally used less water than that used for fresh doughs to avoid crystallization of free water which may cause the dough structure to weaken during long term frozen storage to thereby produce an inferior loaf of bread, the amount of water used in the frozen dough of the invention can be amounts similar to that presently used in dough to be immediately baked.

If the dough is going to be frozen for a short period of time, the mode of freezing is not critical. However, for prolonged stability, the dough should be frozen such that core temperatures of less than $-1°$ C. and preferably between about $-1°$ C. and about $-25°$ C. are obtained within 1 to 6 hours and more preferably within about $1\frac{1}{2}$ to about 4 hours of the time that the dough is placed in the freezing apparatus. When freezing the dough, a uniform cooling rate throughout the dough is desirable. For prolonged stability, the frozen dough should be stored at a temperature below about $-10°$ C.

The addition of a hydrocolloid, particularly the functionalized dairy product and/or the fermentation aid to the frozen dough of the present invention contributes to an increase in volume and a more open texture. In addition, these ingredients assist in eliminating the dense core characteristics of frozen dough when the thaw cycle is eliminated. The fermentation aid can be used in amounts ranging from about 1% to about 3% based on the weight of the flour. An amount ranging from about 1.5% to about 2.5% is preferred. The highest volume and most uniform texture can be achieved utilizing that range. Above this range volume tends to decrease in texture and can become less uniform.

Low levels of the hydrocolloid and particularly the functionalized dairy product containing a thickening polymer contribute to an increase in volume and a more uniform texture in the frozen dough of the invention. Hydrocolloid is used at a level which is effective for that hydrocolloid depending on water holding characteristics of the gum. For the functionalized dairy product containing the thickening polymer, effective results have been found when it is added at a level ranging from about 0.25% to about 3.0% preferably from about 0.25% to about 1.5%. The water level is increased about 0.5% for each additional 0.25% increase in the functionalized dairy product. The combination of the functionalized dairy product and the starch is used in an amount sufficient to provide the functionalized diary product in the amount given hereinbefore. In addition to improving volume, the functionalized dairy product or hydrocolloid can make the dough less susceptible to freezing and thawing damage. The ability of the hydrocolloid or the functionalized dairy product to bind water may decrease crystallization of free water in the frozen dough. Water crystals weaken the dough structure causing less gas retention and decreased volume.

The primary function of oxidizing agents in frozen dough is to strengthen flour proteins to obtain optimum gas retention and dough stability during frozen storage. Various oxidizing agents can be used in frozen dough such as ascorbic acid, potassium bromate and potassium iodate. It has been found that a combination of ascorbic acid and potassium bromate gave the most effective results. Volume was the highest and texture was the most uniform compared to using these materials alone. The level at which the potassium bromate is added is critical. A low level of potassium bromate affects volume. If the amount of potassium bromate is too high, volume decreases. The addition of ascorbic acid alone will give a slightly lower volume and less uniform structure than the ascorbic acid/potassium bromate combination. Combinations of other oxidizing agents such as potassium bromate and potassium iodate provide poor texture though the volume was good. Preferably the potassium bromate is used in an amount ranging from about 5 to about 20 parts per million parts flour and correspondingly from about 70 to about 120 parts ascorbic acid per million parts flour.

Salt at a level ranging from about 1% to about 3% based on the flour has been used in the frozen doughs of the present invention to make the dough more tolerant to frozen storage due to the strengthening affect of the salt on gluten and to inhibit yeast activity to thus retard fermentation during makeup.

Since it is difficult to control proper storage conditions for frozen dough once it leaves the manufacturing location, the composition of the present invention is specifically formulated to be subjected to mishandling and freeze/thaw cycling during transit. Crystallization of free water may weaken the dough structure and decrease the volume of the finished product. The hydrocolloids, particularly the fermented dairy product containing the thickening polymer in combination with the fermentation aid assist in making frozen doughs more tolerable to the less than ideal conditions in the market place.

The frozen dough can be easily baked by thaw-proofing the frozen dough in a heated area for a period of time sufficient to thaw the dough and allow the dough to proof. The dough is allowed to rise during this period but no special thawing step is needed. The thawing and proofing is preferably accomplished at a temperature ranging from about 46° C., and preferably from about 54° C., to about 65° C. Means such as a moist towel, a high degree of relative humidity or basting is used during this period to prevent the formation of a hard skin on the loaf. After the thaw proof has taken place, the baked goods can be baked in an oven for a period of time sufficient to effect the baking of the bread. Baking times ranging from about 20 to about 40 minutes at temperatures of from about 176° C. to about 232° C. have been found to be acceptable under standard conditions. The frozen dough of the present invention can also be prepared by the normal overnight thaw method as presently used by conventional frozen doughs. The frozen dough can be placed in a refrigerator and allowed to thaw followed by a short proofing time and then baking. Dough volume can decrease after long periods of storage requiring a slightly longer proof time.

The present invention will be more fully illustrated in the examples which follow. The functionalized dairy products used in the following examples were prepared using the procedure of Example 1 of U.S. Pat. No. 4,444,792. The fermentation aid was prepared using the procedure of Example 4 of U.S. Pat. No. 4,500,548.

EXAMPLE 1

A frozen dough for preparing white bread was prepared by a standard dough method using the following formulation:

TABLE 1

| Formulation | % Based on Flour |
| --- | --- |
| Bread flour | 100.00 |
| Water | 63.00 |
| Instant Dry Yeast | 4.00 |
| Sugar | 6.00 |
| Creamed Shortening | 6.00 |
| Salt | 3.00 |
| Milk Replacer | 2.00 |
| Functionalized Dairy Product:* | .38 (on a dry basis) |
| Fermentation Aid | 2.00 |
| Ascorbic Acid | 100 ppm |
| Potassium Bromate | 20 ppm |

*Slurried Functionalized Dairy Product in 15% water

All the dry ingredients, including the functionalized dairy product and the fermentation aid were dry blended. The instantized yeast was then dry blended with the previously blended dry ingredients. Water at 26.7° C. was added and the mixture was blended in a jacketed bowl (McDuffy Bowl) with a water bath temperature of 23° C., attached to a Hobart TM planetary mixer for 1 minute at slow speed. After adding the shortening, mixing was continued for 15 minutes at medium speed. The final dough temperature was about 27° C. The dough was rolled, cut into portions each weighing about 520 grams (exact weight given in Tables 2 and 3) and bagged in polyethylene bags. The bagged dough was frozen and stored at −17.7° C. to −23.3° C. for 1 to 20 weeks.

Two methods of baking the frozen dough were utilized in evaluating the frozen dough of the invention. Method A is designed for commercial use and Method B is designed for home use.

Method A: Fermentation Cabinet

1. Set Fermentation Cabinet at 57.2° C. at 90% relative humidity.

2. Place unthawed, frozen dough in a generously greased 20×10×10 centimeter bread pan in the fermentation cabinet.

3. Proof for 60 minutes

4. Bake in preheated (196° C.) bread oven for 30 minutes.

5. Remove bread from pans immediate cool at room temperature.

Method B: Consumer Type Oven

1. Generously baste unthawed frozen dough on top and sides of loaf with a small quantity of melted margarine using a pastry brush.

2. Place basted dough in a well greased 20×10×10 centimeter bread pan and place in preheated warm oven (65.5° C.—warm setting on oven temperature dial)

3. If oven temperature rises above 65.5° C. open oven door slightly to adjust temperature.

4. Proof for 60 minutes. Occasionally brush loaf to distribute margarine over the dough. Bake the bread at 190.5° C. for 25-30 minutes.

5. Half way through baking, cover bread with aluminum foil to prevent excess surface browning.

6. Remove from oven, depan and cool.

The following results were obtained:

TABLE 2

| METHOD A | | |
| --- | --- | --- |
|  | Invention | Control |
| Frozen Weight | 525.0 g | 525.0 g |
| Baked Weight | 474.2 g | 478.2 g |
| Baked Volume | 2200 | 1775 |
| Specific Volume | 4.6 | 3.70 |
| Texture | Even, Slightly Open | Dense, Close |
|  | Invention | Commercial Dough Control* |
| Frozen Weight | 518.0 g | 525.0 g |
| Baked Weight | 462.7 g | 487.0 g |
| Baked Volume | 2400 | 2000 |
| Specific Volume | 5.2 | 4.16 |
| Texture | Open, Airy | Dense, Tight |

*Commercially purchased frozen dough.

The doughs were proofed under heat without a separate thawing step. After baking, the breads were cooled overnight and evaluated. The data shows that the bread prepared from the frozen dough of the invention was more tolerant to a non-thaw prior to proofing method of preparing the bread than the control or a commercial frozen dough.

Volume was higher for the bread prepared using the frozen dough of the invention. Specific volumes of 4.6-5.2 were obtained vis-a-vis 3.7-4.1 for the controls. The bread prepared from the frozen dough of the invention had a more even and open texture, providing a softer loaf. The control breads evidenced a dense center core, resulting in a firm bread with unacceptable texture and volume.

During proofing, the commercial dough evidenced a high amount of water seepage from the dough. The dough of the invention did not evidence this problem.

TABLE 3

| METHOD B | | |
| --- | --- | --- |
|  | Invention | Commercial Control* |
| Frozen Weight | 517.0 g | 524.4 g |
| Baked Weight | 484.0 g | 500.0 g |
| Baked Volume | 2025 | 1525 |
| Specific Volume | 4.1 | 3.0 |

TABLE 3-continued

| METHOD B | | |
|---|---|---|
| Texture | Open | Dense, Close |
| | Invention | Control |
| Frozen Weight | 525.0 g | 525.0 g |
| Baked Weight | 472.2 g | 486.0 g |
| Baked Volume | 2300 | 1500 |
| Specific Volume | 4.87 | 3.10 |
| Texture | Airy, Open | Dense |

*Commercially purchased frozen dough.

The results obtained using Method B were similar to that obtained using Method A. The breads produced with the frozen doughs of the invention using a no-thaw proofing technique were characterized by a higher volume and a more open and soft texture vis-a-vis breads prepared with the control frozen doughs which were characterized by unsatisfactory volume and a dense inner core producing a firm loaf.

Satisfactory breads can be prepared from the controls by thawing the dough first and then proofing the dough. The frozen dough of the invention does not require the thawing step prior to proofing and provides a loaf which does not have a dense core characteristic of thaw and proof doughs which are thaw-proofed in one step.

What is claimed is:

1. A method for producing a frozen, no proof, yeast leavened dough which comprises preparing a yeast-containing dough, said yeast-containing dough additionally comprising a hydrocolloid in an amount sufficient to increase the volume of the dough, and from about 0.25% to about 3% of a fermentation time reducer, said fermentation time reducer being prepared by a process comprising fermenting a mixture of flour, sugar in an amount ranging from 0 to about 10% by weight based on the weight of the flour, from about 55 to about 250 parts water per 100 parts flour and a yeast of the species Saccharomyces cerevisiae in an amount sufficient and for a minimum of 12 hours, said period of time being sufficient to decrease the pH of the mixture to a pH below 4.75: and drying the fermented mixture to a moisture content of from about 4.5% to about 9.0% under conditions such that a major amount of the volatile components of the mixture with the exception of water remain in the fermentation aid product after drying, and freezing the dough without substantial proofing of the dough prior to freezing.

2. The method of claim 1 wherein said hydrocolloid is xanthan.

3. The method of claim 1 wherein said hydrocolloid is a functionalized product containing an effective amount of a functionalized dairy product prepared by fermenting, with a polymer-producing microorganism, a dairy product based substrate containing a growth-supporting carbohydrate source for said microorganism, said functionalized dairy product having a viscosity of about 200 centipoises at a shear rate of 12 s$^{-1}$.

4. The method of claim 3 wherein the microorganism is of the genus Xanthomonas.

5. The method as recited in claim 3 wherein the microorganism is *Xanthomonas campestris*.

6. The method of claim 3 wherein the microorganism is *Leuconostoc mesenteroides*.

7. The method as recited in claim 3 wherein the microorganism is selected from the group consisting of *Xanthomonas campestris* ATCC 31922, *Xanthomonas campestris* ATCC31912, *Leuconostoc mesenteroides* ATCC 14935 and mixtures thereof.

8. The method as recited in claim 3 wherein the microorganism is *Xanthomonas campestris* ATCC 31923 and the carbohydrate is lactose.

9. The method of claim 1 wherein said hydrocolloid is a functionalized dairy product is present in an amount ranging from about 0.25 percent to about 3.0 percent based on the total flour content of the product.

10. The method of claim 3 wherein the functionalized dairy product is dried prior to use in said bakery product.

11. The method as recited in claim 1 wherein said sugar is used in an amount ranging from about 3 parts to about 8 parts by weight per 100 parts flour.

12. The method as recited in claim 1 wherein said yeast is used in an amount sufficient to provide an initial cell population ranging from about $30 \times 10^7$ to about $220 \times 10^7$ cells per gram of flour.

13. The method as recited in claim 1 wherein the pH prior to being decreased ranges from about 5.1 to about 5.7.

14. The method as rectied in claim 1 wherein the fermentation is conducted from about 12 hours to about 3 days.

15. The method as recited in claim 1 wherein said dough additionally contains oxidizing agents.

16. The method as recited in claim 15 wherein said oxidizing agent comprises ascorbic acid.

17. The method as recited in claim 15 wherein said oxidizing agent comprises from about 70 to about 120 parts per million ascorbic acid and from about 5 to about 20 parts per million potassium bromate based on the weight of the flour.

18. The method as recited in claim 1 which includes the further steps of thaw-proofing the frozen dough and baking the thaw-proofed dough.

19. A frozen nonproofed yeast-containing dough additionally comprising a hydrocolloid in an amount sufficient to increase the volume of the dough and from about 0.25% to about 3% of a fermentation time reducer, said fermentation time reducer is prepared by a process comprising fermenting a mixture of flour, sugar in an amount ranging from 0 to about 10% by weight based on the weight of the flour, from about 55 to about 250 parts water per 100 parts flour and a yeast of the species *Saccharomyces cerevisiae* in an amount sufficient and for a minimum of 12 hours, said period of time being sufficient to decrease the pH of the mixture to a pH below 4.75: and drying the fermented mixture to a moisture content of from about 4.5% to about 9.0% under conditions such that a major amount of the volatile components of the mixture with the exception of water remain in the fermentation aid product after drying, said dough being substantially unproofed prior to freezing, said frozen dough being capable of baking without a dense core after thawing without a separate proofing stage.

20. The product of the method of claim 1.
21. The product of the method of claim 4.
22. The product of the method of claim 19.

* * * * *